United States Patent [19]

Häggström

[11] Patent Number: 5,582,050
[45] Date of Patent: * Dec. 10, 1996

[54] CYLINDER LOCK-KEY-COMBINATION, A KEY THEREFOR AND A METHOD OF PRODUCING THE KEY FROM A KEY BLANK

[75] Inventor: Åke Häggström, Lycksele, Sweden

[73] Assignee: ASSA AB, Eskilstuna, Sweden

[*] Notice: The term of this patent shall not extend beyond the expiration date of Pat. No. 5,517,840.

[21] Appl. No.: 244,602

[22] PCT Filed: Dec. 18, 1992

[86] PCT No.: PCT/SE92/00880

§ 371 Date: Jun. 2, 1994

§ 102(e) Date: Jun. 2, 1994

[87] PCT Pub. No.: WO93/12314

PCT Pub. Date: Jun. 24, 1993

[30] Foreign Application Priority Data

Dec. 19, 1991 [SE] Sweden ................................. 9103779
May 8, 1992 [SE] Sweden ................................. 9201462

[51] Int. Cl.[6] ................................................. E05B 27/00
[52] U.S. Cl. ................................. 70/495; 409/81; 409/132; 76/110; 70/406; 70/409; 70/392
[58] Field of Search ............................ 70/495, 406, 409, 70/494, 392, 493, 421, 407; 76/110; 409/81, 132

[56] References Cited

U.S. PATENT DOCUMENTS

| 2,687,639 | 8/1954 | Swanson | 70/421 |
|---|---|---|---|
| 3,035,433 | 5/1962 | Testa | 70/495 |
| 3,264,852 | 8/1966 | Gysin . | |
| 3,418,833 | 12/1968 | Kerr | 70/409 |
| 3,509,749 | 5/1970 | Regan et al. | 70/408 |
| 4,356,713 | 12/1982 | Widen | 70/409 |
| 4,393,673 | 7/1983 | Widen | 70/358 |
| 4,761,976 | 8/1988 | Kleinhany | 70/421 |
| 4,977,767 | 12/1990 | Prunbauer | 70/495 |
| 5,067,335 | 11/1991 | Widen | 70/495 |
| 5,372,024 | 12/1994 | Ruckert | 70/406 |

FOREIGN PATENT DOCUMENTS

| 0103532 | 3/1984 | European Pat. Off. | 70/495 |
|---|---|---|---|
| 575828 | 4/1933 | Germany . | |
| 3836872 | 5/1990 | Germany | 70/409 |
| 455801 | 8/1988 | Sweden . | |

*Primary Examiner*—Darnell M. Boucher
*Attorney, Agent, or Firm*—Sughrue, Mion, Zinn, Macpeak & Seas

[57] ABSTRACT

A cylinder lock-key-combination includes a lock cylinder, a cylinder housing (2) and a cylinder plug (3) provided with a key slot (3a) and a row of tumblers (5). The tumblers (5) and associated key (4) present mutually adapted engaging and receiving members which function to forcibly guide movement of the tumblers in two opposite axial directions as the key is inserted into the lock. For instance, the pin tumblers (5) include a circular flange (5a) and a side surface of the key (4) includes a groove (4b) which extends along the length of the key and whose width varies so as to accommodate the flanges of the rotatable or twistable tumblers. Alternatively, the tumblers are provided with a groove or a waisted portion and the key is provided on a side surface thereof with a rail which engages in the groove or waisted portion. In addition, the tumblers (5) may be provided with waisted portions (5b) to enable the tumblers to function as latching pins in coaction with a side-bar, or to form bottom tumblers for coaction with corresponding spring-activated top tumblers, or to function as locking pins in direct engagement with bores provided in the lock housing. The invention also relates to a key for forcibly guiding the pin tumblers, and also to a method of manufacturing such a key from a key blank.

22 Claims, 10 Drawing Sheets

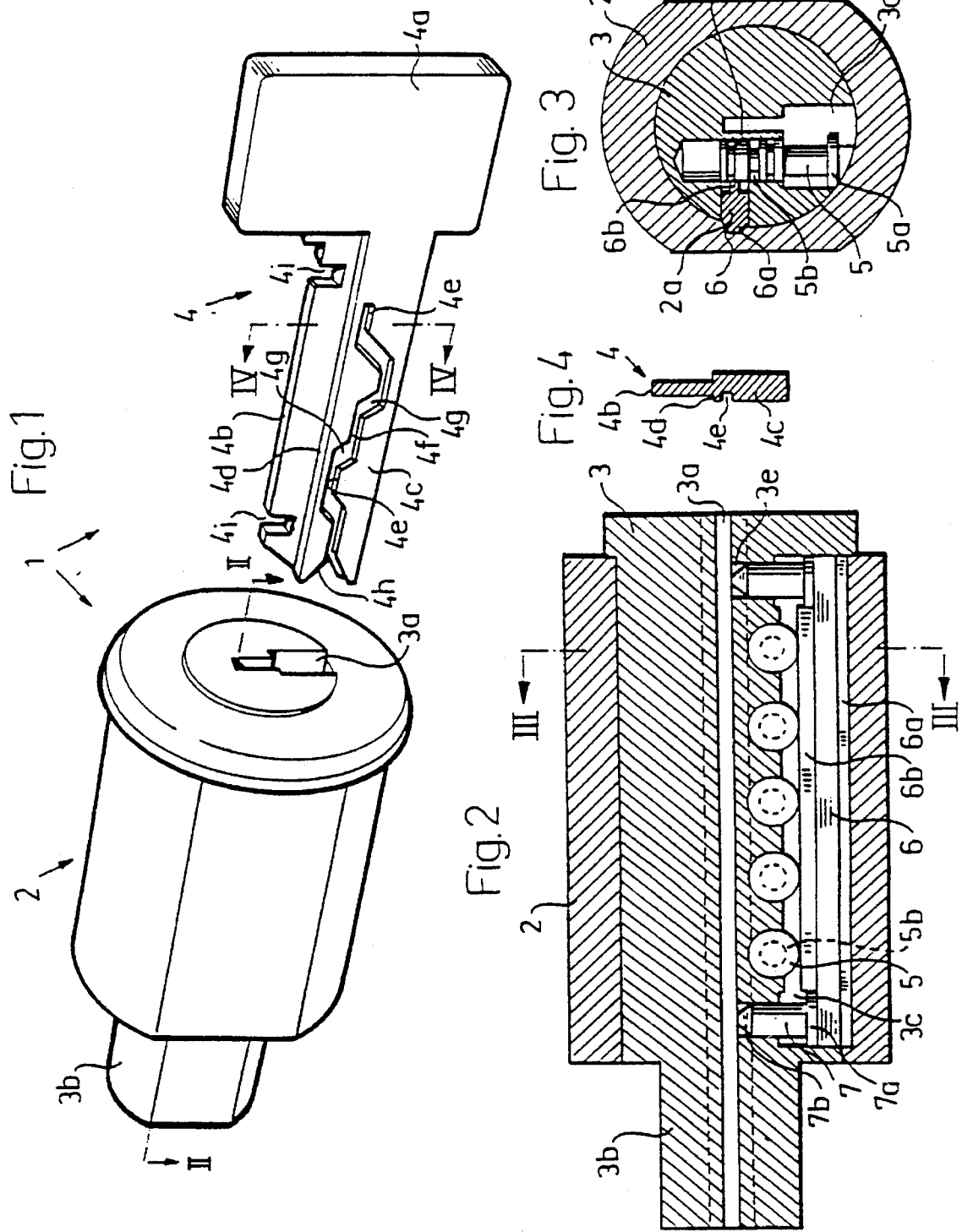

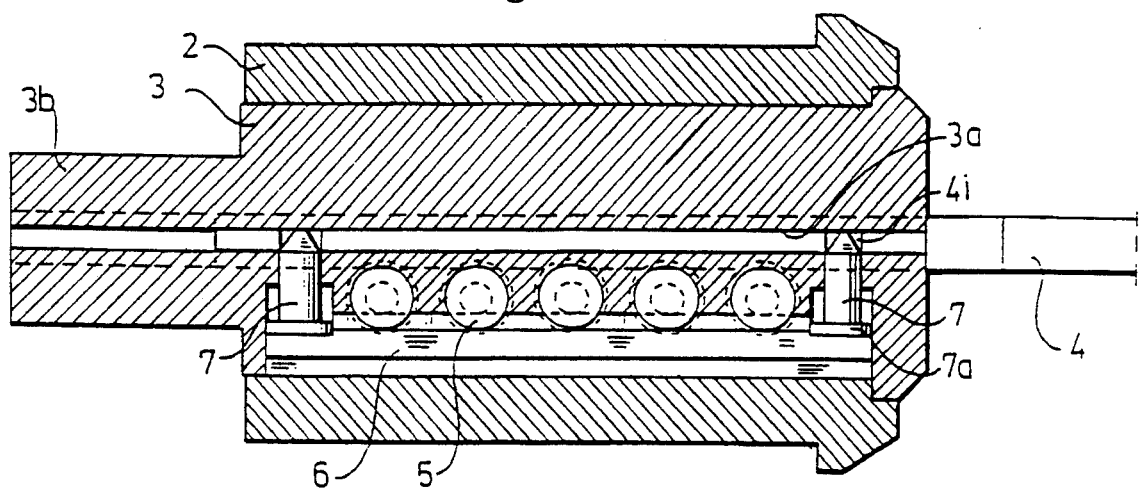
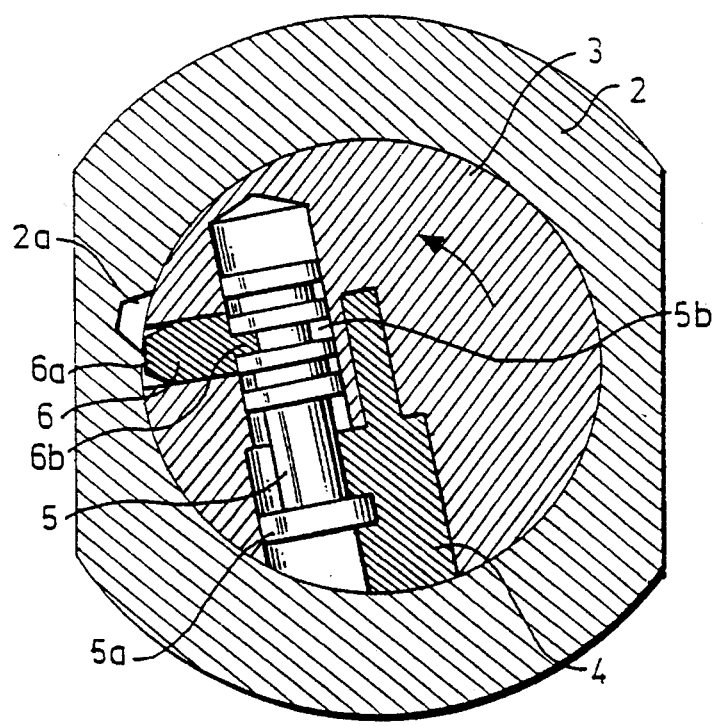
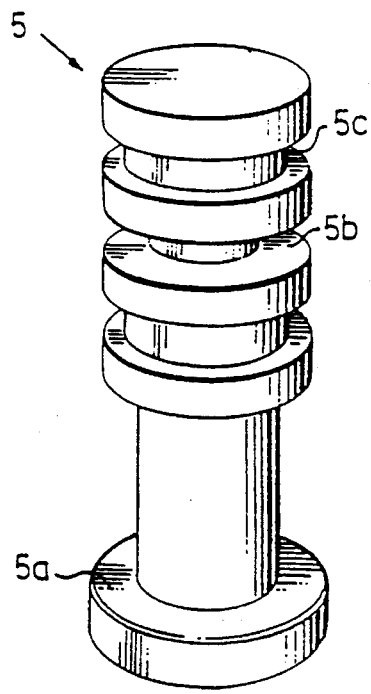

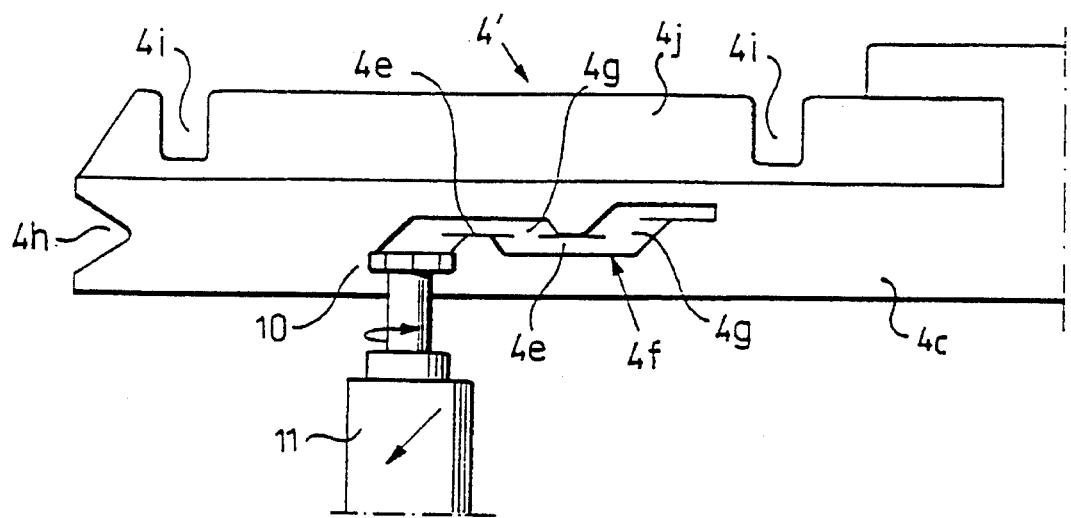
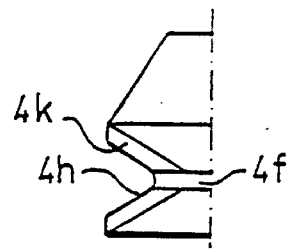
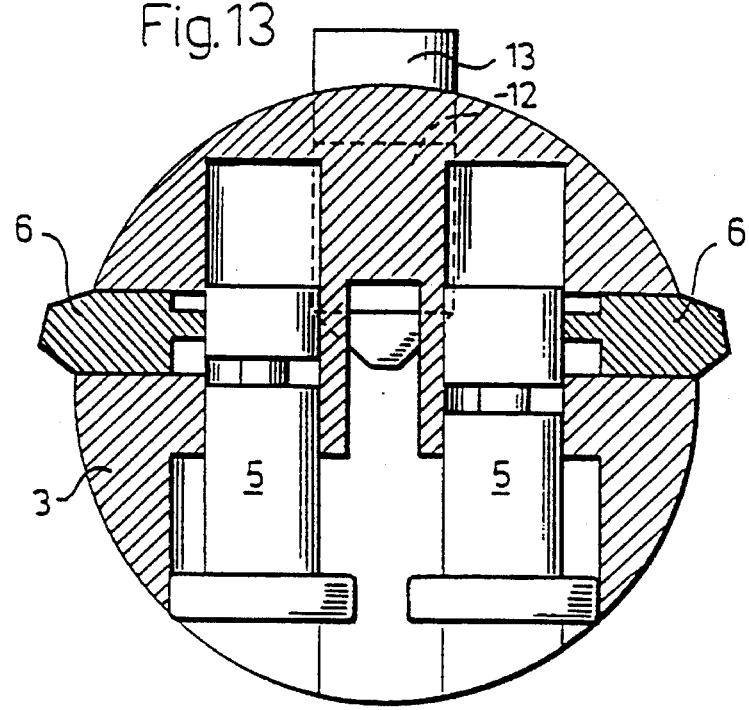

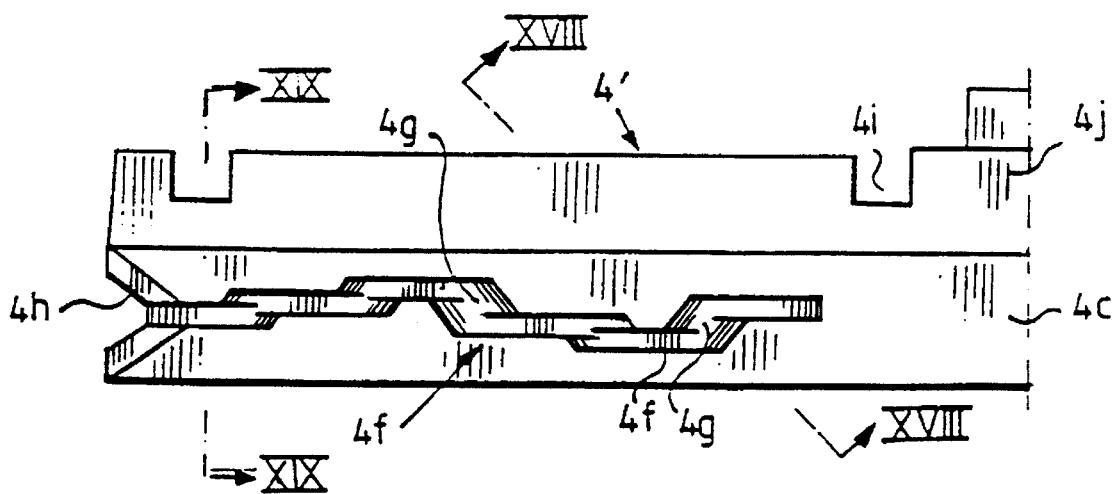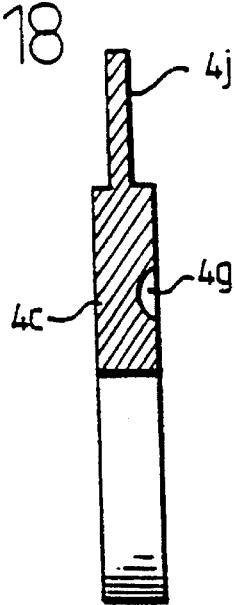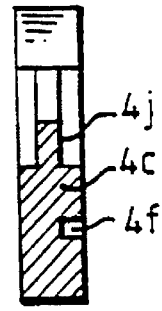

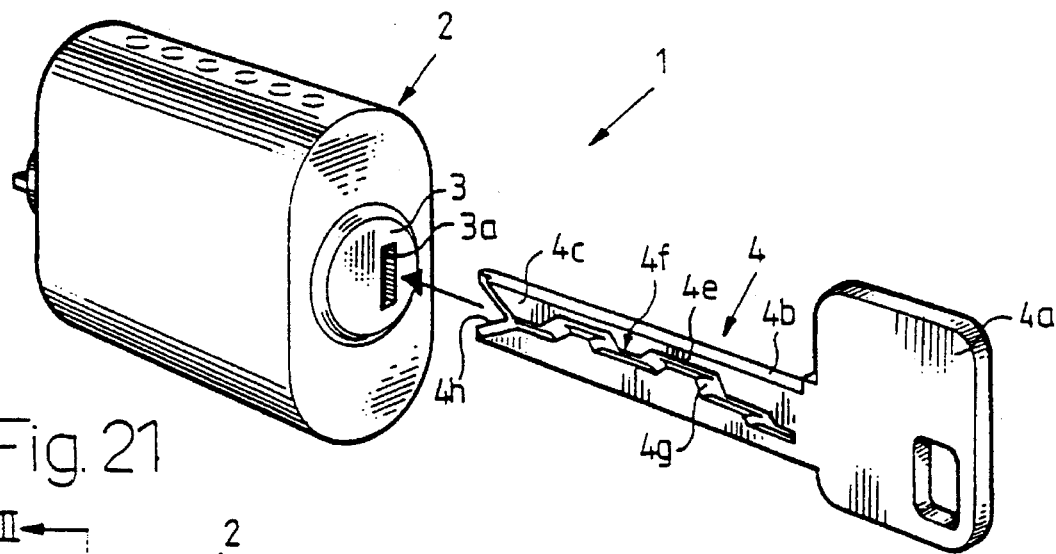
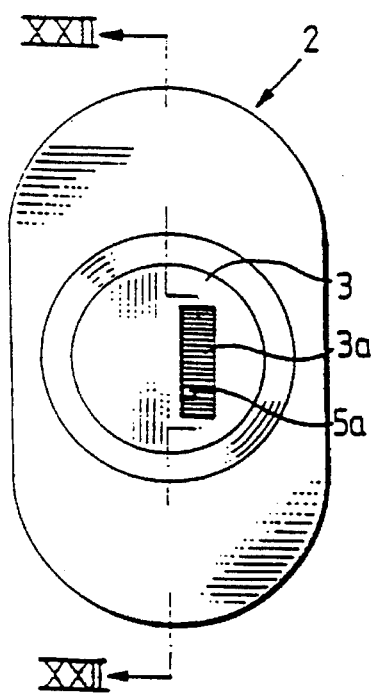
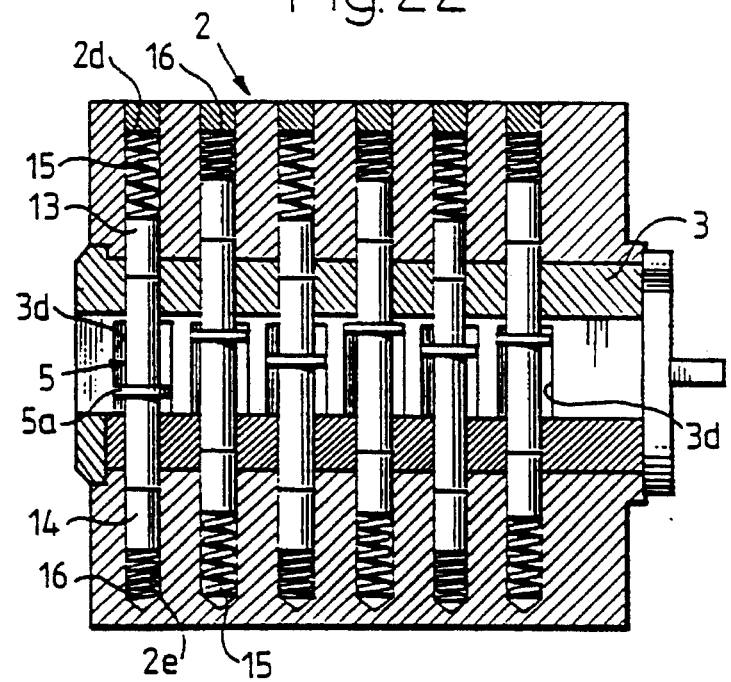

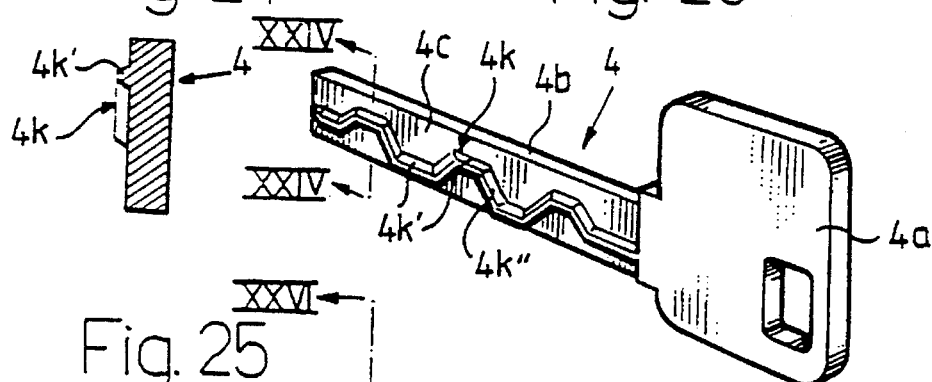
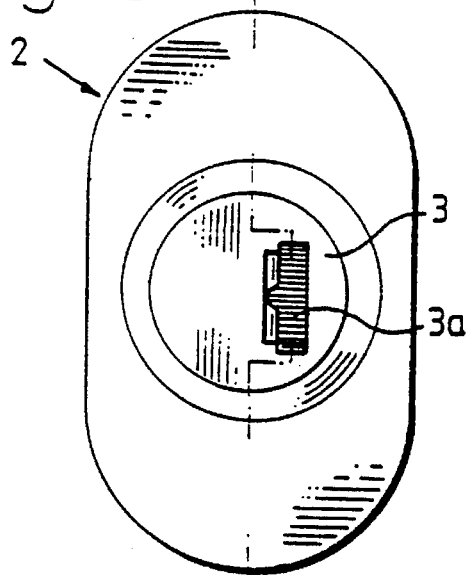
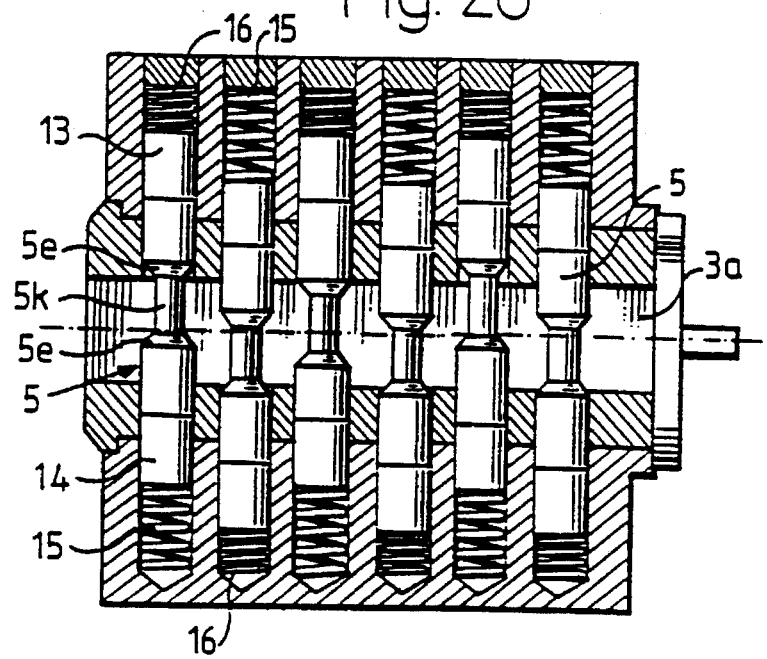

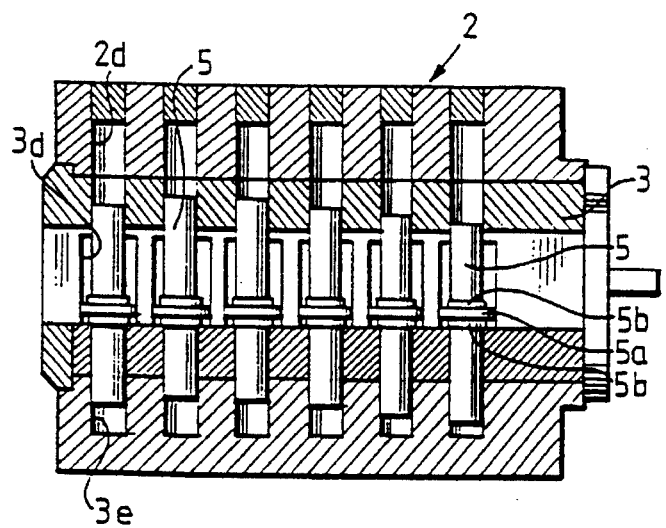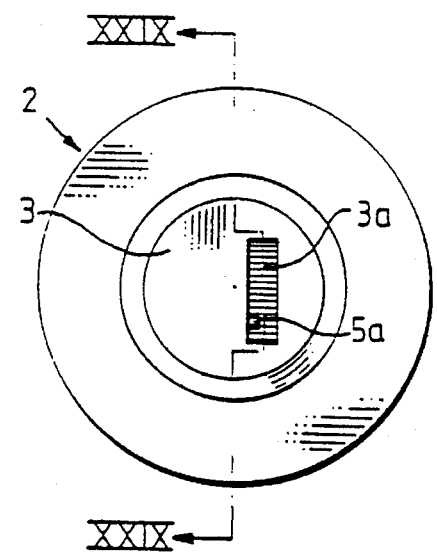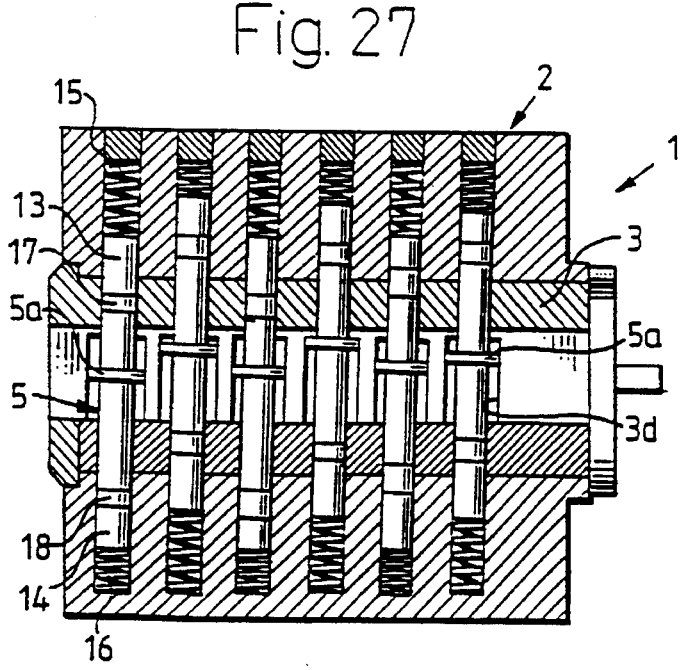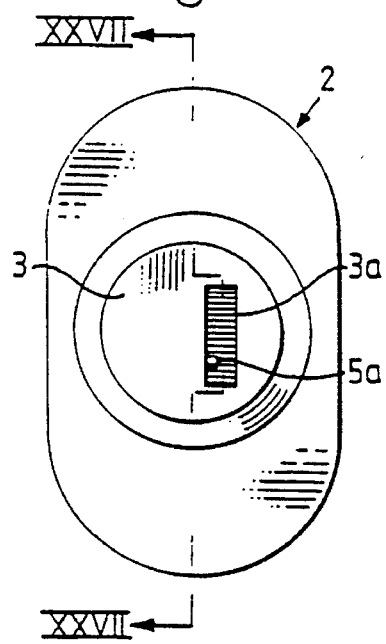

CYLINDER LOCK-KEY-COMBINATION, A KEY THEREFOR AND A METHOD OF PRODUCING THE KEY FROM A KEY BLANK

FIELD OF INVENTION

The present invention relates to a cylinder lock-key-combination, and more specifically to a cylinder lock-key-combination of the kind defined in the preamble of claims.

The invention also relates to a key for such a combination, and also to a method of producing such a key from a key blank.

BACKGROUND ART

SE,B, 422,491 (GKN-Stenman) and U.S. Pat. No. 4,393,673 (Widén) describe a combination of this kind in which the key, in addition to a web part, has a side part which includes a coded surface having code parts or shoulders for engagement with an edge part of one end of the respective pin tumblers and with transition parts which extend in the direction of the long axis of the key between mutually adjacent code shoulders. The code shoulders and transition parts of the side part of the key include parts of surfaces which are described by a point or by a line or curve provided with an end point which rotate with said point for said end point at a given distance from a point on an axis which extends generally parallel with the axes of the pin tumblers, said axes moving continuously or discontinuously in a plane that extends through the pin axes or in a plane which is generally parallel therewith.

The pin tumblers may coact with spring-activated top tumblers or may themselves be activated and provided with waisted parts for coaction with outwardly projecting shoulders on a side-bar.

The side-bar is spring-biased outwardly from the cylinder, into engagement with a recess in the lock housing, this recess being configured to urge the side-bar into the cylinder plug as it rotates, subsequent to having inserted the correct key into an operative position in the plug. The side-bar includes a number of lugs having rounded engagement surfaces which coact with waisted parts of the side-bar. In manufacture, the coded surfaces and the intermediate transition surfaces must be produced very accurately, and consequently the cylinder lock taught by this prior publication is comparatively expensive to produce.

U.S. Pat. No. 5,067,335 and SE,B, 455,801 (Widén) describe another type of lock which is provided with a side-bar and the pin tumblers of which are guided forcibly in different directions of rotation and have a form which makes the lock expensive to produce.

U.S. Pat. No. 3,264,852 (Gysin) teaches a cylinder lock with which there is used a key which is provided on the side surfaces thereof with grooves which, when the key is inserted to an operative position in the plug, coact with tumblers that have outwardly projecting pins for engagement in respective grooves. The tumblers of this lock do not coact with a side-bar. Moreover, the pins on the tumblers are subjected to a relatively high degree of wear, which is liable to jeopardize the function of the cylinder lock after long-time use.

Another example of the standpoint of techniques is found in DE,C, 575,828 (Albert Brun in Paris).

OBJECTS OF THE INVENTION

One object of the present invention is to provide a cylinder lock-key-combination which can be manufactured simply and the mutually coacting, movable parts of which will be subjected only to a small degree of friction, causing only slight wear on said movable parts and achieving continued reliable function of the combination over a long period of use.

Another object of the invention is to provide a combination of the aforesaid kind which will function smoothly and effectively even in harsh environments, for instance when the lock is exposed to moisture and/or cold.

A further object of the invention is to provide a cylinder lock of small dimensions which will nevertheless provide an extraordinarily large number of possible combinations, therewith making it difficult to force the lock.

DISCLOSURE OF THE INVENTION

These and other objects of the invention are fulfilled with an inventive cylinder lock-key-combination of the aforesaid kind which is mainly characterized by the features set forth in the characterizing clause of claims.

The mutually coacting engaging and receiving members ensure that the tumblers are moved forcibly in an axial direction into their respective coded positions. At the same time, the tumblers are able to rotate or twist freely in the cylinder plug, meaning that mutually coacting engagement surfaces vary and that these mutually coacting members will only be subjected to a small degree of wear.

The friction between mutually coacting components is relatively small, particularly in those cases when the tumblers are not acted upon by springs. This increases the length of useful life of the lock.

The forcibly guided movement of the tumblers means that the tumblers need not be spring-activated. However, the lock may be provided with springs which, for instance, engage the tops of the tumblers so as to ensure that the tumblers will move to desired positions in the axial directions of said tumblers upon withdrawal of the key.

A principle embodiment of the invention is characterized by the characterizing features set forth in claims. In this case, the groove may be straight and extend parallel with those parts of the key which extend in the key-insertion direction and which normally define the code positions of the key and intermediate, angled transition parts of greater width.

This double engagement of the tumbler flanges, on both the top and the bottom surfaces thereof, results in more accurate positioning of the tumblers in respective code positions. The intermediate, angled and wider transition parts of the groove will offer only slight resistance to key movement as the key is inserted into and withdrawn from the plug.

However, the inventive concept also includes the possibility of defining one or more code positions in the angled transition parts of the key. Movement of the pin tumblers at right angles to the key-insertion direction is extremely precise, insofar as the pin tumblers take a definable position in the movement plane of the pins in each key position. The provision of a code position in an angled transition part renders it difficult to determine the code positions of the key.

The tip of the key may have a widening end-region adjacent the groove. This ensures that when the key is moved to an operative position in the plug, the groove will capture all of the pin flanges, irrespective of their positions.

To this end, the end of the key may conveniently be provided with a V-shaped recess or notch which is delimited by a corresponding V-shaped shoulder part which converges with the groove at the apex of the V.

According to one advantageous embodiment of the combination, the plug of the cylinder lock is provided with a side-bar accommodating recess, in which case the tumblers can be designated latching pins. The side-bar is movable in a plane which is perpendicular or generally perpendicular to the plane of the latching pins.

In this case, the cylinder housing also includes a groove or a recess which accommodates the side-bar in its locking position, and the side-bar includes a member, for instance a tongue, which in its released position coacts with a corresponding member, for instance, a groove or a waisted portion on the tumblers in the tumbler row, so that the side-bar is able to leave the recess in the cylinder housing as the plug is turned.

In order to ensure reliable function, it is preferred that the side-bar is activated by one or more driving pins which coact with the side surface of the key and which are guided for movement in the plug at right angles to the plane of the key slot and which function to press the side-bar out to its locking position as the key is withdrawn from its operative position with the side-bar in its release position.

Thus, the side-bar is also guided forcibly in the aforedescribed manner, thereby ensuring that the side-bar will function reliably. By guiding the driving pins in the cylinder plug, it is ensured that no jamming will occur as the side-bar moves.

It is conceivable to use only one driving pin in certain cases, although it is normally preferred to provide one driving pin at which end of the side-bar.

The driving pins may optionally be enclosed by springs which facilitate and assist movement of the side-bar to its locking position.

In order to ensure that the driving pins will function as intended, the ends of the pins distal from the side-bar will preferably engage in a corresponding recess or notch in the key, when the key is fully inserted. Those ends of the driving pins which enter the recess are preferably tapered conically to form a pointed tip, which facilitates the purpose of the driving pins in urging the side-bar into its locking position as the key is withdrawn from its operative position. In other words, the tips of the driving pins are moved up out of the recesses as the key is withdrawn, therewith moving the side-bar forcibly into its locking position.

In this connection, in order to ensure that the driving pins and the side-bar will function smoothly and effectively, the rectilinear, normal code positions of the key groove are extended along a distance which exceeds the radius of the driving pins, as in accordance with one preferred embodiment of the invention. The pin tumblers will therewith remain in their code positions during the initial phase of withdrawing the key, during which the driving pins, as they leave their respective apertures or recesses, will urge the side-bar in a direction generally at right angles to the key withdrawal direction.

Normally, these extended parts of the code positions will correspond roughly to the diameter of the driving pins, therewith ensuring that the desired movement sequence is carried out correctly.

The driving pin aperture or apertures in the key is/are preferably formed in conjunction with manufacturing the key blank. Thus, the apertures, or recesses, may be formed in direct conjunction with clipping the key blank from a metal plate.

However, instead of being provided with apertures or recesses of this kind, the key blank may be provided with depressions or hollows whose depths correspond to or exceed the penetration depth of the member, e.g. the tongue on the side-bar, in corresponding members, e.g. the waisted part of respective tumblers. This will ensure that the side-bar correctly leaves its release position and is forcibly guided to its locking position as the key is withdrawn. The key cannot be turned unless these apertures, recesses or depressions are correctly positioned. The apertures, recesses or depressions may be differently placed, e.g. for the classification of different series of cylinder locks.

The plug space can be utilized to the best effect when the other side of the key is also grooved for coaction with a further row of pin tumblers and a side-bar in the cylinder plug. The cylinder may then be made shorter.

It will be understood that the number of code combinations for the lock concerned can be increased exponentially in this way. It is also possible to allow the edge surfaces of the key between the two grooved side surfaces thereof to coact with pin tumblers of a more or less conventional kind, thereby further increasing the combination possibilities of the lock.

In the case of one particular application of the invention, the key slot provided in the plug can accommodate two different keys, each for coaction with respective pin tumblers accommodated in each plug half, each of these pins, in turn, coacting with a respective side-bar in the aforedescribed manner.

In such cases, a lock of this kind can be used when two persons are authorized to open a lock in unison, each of these persons having one of the keys in his/her charge. In this case, it is impossible to open the lock unless both persons are present with their respective keys at one and the same time.

In the case of an alternative embodiment, the flanged tumblers form bottom tumblers which coact with preferably spring-activated top tumblers, optionally through the agency of one or more intermediate tumblers. The flanges will then suitably be spaced from the ends of respective tumblers and will have a part of smaller diameter on their top and bottom sides.

According to another alternative, the pins may function as locking pins for direct engagement in the cylinder housing, i.e. without coacting with an top tumbler. In this case, the flanges are conveniently spaced from both ends of respective tumblers.

Another principle embodiment of the invention has the characteristic features set forth in claim 12. The pin tumblers of this embodiment are also accommodated in the cylinder lock for rotation about their longitudinal axes. In this case, the axial length of the waisted portion will preferably exceed the width of the rail. When the tumblers are moved to their locking positions as the key is withdrawn, it is ensured that one part of the waisted portion of respective tumblers will be located in the region in which the forward part of the key rail will move as the key is again inserted into the key slot in the core in order to reopen the lock.

It is preferred in practice to delimit the waisted portion of respective tumblers by conical transition parts. This facilitates engagement of the tumblers as the key is inserted and movement of said tumblers as they pass the angled parts of the code groove.

Both of the principle embodiments of the invention may have the characteristic features set forth in claim 6, therewith rendering forcing of the lock difficult, and —when so-called intermediate tumblers are used—the lock can function as a system lock which incorporates a master-key and a standard-key function.

Forcing of the lock is made still more difficult when the inventive combination has the characteristic features set forth in claim 7.

The difference between the spring force of all counteracting springs will therewith correspond suitably to approximately the spring force exerted by a standard tumbler spring in a cylinder lock.

In this arrangement, the stronger spring will compress the weaker spring to a minimum length. In the locked position, the stronger spring will move adjacent top or bottom tumblers and the intermediate tumblers and the key-actuable tumbler to a position in which the cylinder plug cannot be turned. A double locking function is therewith achieved in this case. This makes the lock cylinder particularly difficult to force.

For instance, if the key-actuable tumbler is moved as far as possible against the action of the stronger spring when attempting to force the lock, the central tumbler will take a locking position while, at the same time, the bottom or top tumblers and the intermediate tumblers acted upon by the weaker spring will be moved to a locking position. This makes it particular difficult to force the lock.

The best function is obtained when the stronger and weaker springs are positioned in the manner defined in claim 10.

The ends of the central, key-actuable tumblers will preferably be chamfered so as to enable the pins to readily enter corresponding top and bottom holes in the lock cylinder. The ends of the top tumblers, when present, will also be chamfered.

It is preferred in both of the aforesaid principal embodiments that the key slot is positioned asymmetrically in the plug, such that the tumbler axes will lie essentially in the centre plane of the plug. In this embodiment, the dividing plane between the central tumbler and the coacting top and bottom tumblers and the intermediate tumblers will obtain the most advantageous position.

It is also possible within the scope of the invention to displace the tumblers laterally, so that their axes lie in a plane on one side of a symmetry plane through the plug. However, in this case, the dividing plane between the central tumbler and the top and bottom tumblers will take a sloping position in relation to the tumbler axes, which may impair the correct function of the cylinder lock. For instance, when the central tumbler and the top and the bottom tumblers are provided with an oblique surface for correct coaction, certain limitations are caused with regard to the ability of the central tumbler to rotate about its long axis in the cylinder plug. As defined in claim 13, obliquely drilled tumbler holes may also be provided. In this case, it is necessary to turn the key through 360° before it can be removed from the lock, therewith enhancing lock security.

The invention also relates to different types of keys for respective combinations of the aforesaid kind, these keys being characterized mainly by the characteristic features set forth in claims 21 and 22.

According to another aspect, the invention also relates to a method of manufacturing a combination key from a key blank, this method being characterized mainly by the characteristic features set forth in claim 23.

The invention will now be described in more detail with reference to a number of exemplifying embodiments thereof and also with reference to the accompanying drawings.

BRIEF DESCRIPTION OF THE DRAWINGS

FIG. 1 is a perspective view of an inventive combination, comprising a lock cylinder and an associated key.

FIG. 2 is a sectional view of the lock cylinder shown in FIG. 1, taken on the line II—II.

FIG. 3 is a sectional view of the lock cylinder shown in FIG. 2, taken on the line III—III.

FIG. 4 is a sectional view of the key shown in FIG. 1, taken on the line IV—IV.

FIG. 5 is a sectional view of the lock cylinder shown in FIGS. 1–3 subsequent to having inserted the key and turned the key through 90°.

FIG. 7 is a sectional view corresponding to FIG. 2 with the key inserted and subsequent to commencing turning of the plug.

FIG. 8 is a perspective view of a pin tumbler.

FIG. 11 illustrates the cutting of a groove in a key blank according to FIG. 10, such as to provide the blank with a side code.

FIG. 12 illustrates the configuration of the groove in the vicinity of the tip of the key.

FIG. 13 is a sectional view corresponding to the view of FIG. 3 and illustrates a modified embodiment in which the cylinder plug is provided with double rows of pin tumblers and associated side-bars and also top tumblers.

FIG. 17 is a view corresponding to FIG. 11 and illustrates the key blade upon completion of a milling operation.

FIG. 18 is a sectional view taken on the line XVIII—XVIII in FIG. 17.

FIG. 19 is a sectional view taken on the line XIX—XIX in FIG. 17.

FIG. 20 is a perspective view of one embodiment of an inventive combination comprising a lock cylinder and an associated key.

FIG. 21 is a front view of the lock cylinder shown in FIG. 20.

FIG. 22 is a sectional view taken on the line XXII—XXII in FIG. 21.

FIG. 23 is a perspective view of a key belonging to an alternative principal embodiment of an inventive combination.

FIG. 24 is a sectional view taken on the line XXIV—XXIV in FIG. 23.

FIG. 25 is a front view of a lock cylinder belonging to a combination according to the alternative principal embodiment.

FIG. 26 is a sectional view taken through the lock cylinder on the line XXVI—XXVI in FIG. 25.

FIG. 27 is a sectional view of an inventive lock cylinder forming part of a system lock in accordance with the first principal alternative.

FIG. 28 is a front view of the lock cylinder shown in FIG. 27.

FIG. 29 is a sectional view of a further modification of a lock cylinder according to the first principal alternative.

FIG. 30 is a front view of the embodiment shown in FIG. 29.

DETAILED DESCRIPTION OF THE PREFERRED EMBODIMENTS

Figure 6:
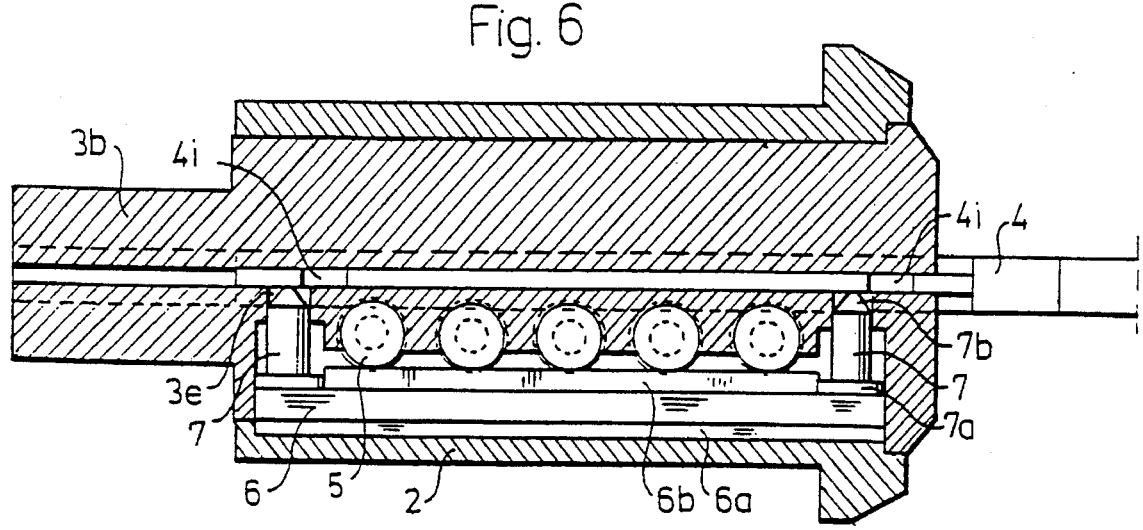
FIG. 6 is a sectional view corresponding to FIG. 5, subsequent to commencing withdrawal of the key from its operative position.

FIG. 1 illustrates a cylinder lock-key-combination which comprises of a lock cylinder 2 and a key 4. the lock cylinder 2 accommodates a plug 3 provided with a key slot 3a.

As shown in FIGS. 2 and 3, the plug 3 accommodates a row of pin tumblers 5 which coacts with a side-bar 6 and whose axes lie in a plane which extends parallel with the plane of the key slot 3a and spaced from said plane. The pin tumblers 5 are movable in said plane and can be twisted or turned about their geometric axes.

The pin tumblers 5 are provided at their respective bottom ends with a flange 5a which is received in a groove 4f in the side surface 4c of the key 4. The configuration of the groove will be described in more detail herebelow.

The plug 3 also includes an aperture 3c which accommodates the side-bar 6. The side-bar 6 coacts with the pin tumblers 5 and is movable in said aperture in a plane that extends at right angles to the plane of the pin tumblers, although it may define an angle relative to this plane.

The side-bar has a narrowing forward part 6a which is accommodated in a correspondingly shaped aperture or recess 2a in the lock cylinder 2. One long side of the side-bar includes a tongue 6b which is intended to engage a waisted part 5b of respective pin tumblers 5. FIG. 3 shows the side-bar 6 in its locking position, in which the tongue 6b does not engage a waisted part 5b, therewith preventing the side-bar 6 from leaving its locking position. The pin tumbler 5 will not take a position in which the side-bar 6 is able to move to its release position until the correct key 4 has been inserted in its operative position in the slot.

The key 4 has an top edge surface 4b which may be optionally provided with a code (not shown) in a conventional manner, for coaction with an additional pin tumbler (not shown) in the plug.

The key 4 includes a key grip 4a and a shoulder 4d that forms an top defining surface of a side part 4c in which the aforesaid groove 4f is formed for coaction with the flanges 5a on respective pin tumblers 5.

The width of the groove 4f varies and the groove includes a number of straight code parts 4e and intermediate angled transition parts 4g whose widths are greater than the code parts 4e.

The groove widens outwardly at the tip of the key, as indicated at 4h, so as to ensure that the flanges 5a of the pin tumblers 5 will be engaged by the groove.

As the key 4 is inserted, the groove 4f will engage both the top and the bottom sides of the flanges 5a on the pin tumblers 5 and therefore force the tumblers to move to their respective code positions.

The plug 3 is provided with bores 3e in the region of the ends of the side-bar 6, for accommodating driving pins 7 having heads 7a which engage respective end-parts of the side-bar 6. The ends of the driving pins 7 which face towards the key slot 3a narrow conically and are intended to be received in recesses or notches 4i in the end regions of the blade part of the key 4, as the side-bar moves to its release position.

The driving pins 7 are also intended to move the side-bar 6 forcibly to its locking position. FIG. 5 is a sectional view of a lock cylinder according to FIGS. 2 and 3, with the key inserted and turned through 90°. In this operational state of the lock, the side-bar 6 is in its release position and the conical ends 7b of the driving pins 7 are located in the recesses or notches 4i in the key 4.

FIG. 6 is a view which corresponds to FIG. 5 and which illustrates initial withdrawal of the key from its operative position. Thus, the key 4 has been withdrawn through a distance which slightly exceeds the radius of the driving pin 7. The tips 7b of the driving pins have therewith left the notches 4i in the key while moving at right angles thereto and urging the side-bar 6 outwards to its locking position. The cylinder housing 2 includes an elongated recess 2a for accommodating the side-bar 6 in its locking position.

The driving pins 7 thus ensure that the side-bar will be forcibly guided to its locking position as the key is withdrawn from the key slot 3a. In order to ensure that the pin tumblers 5 will not move from their code positions upon initial withdrawn of the key, the straight code positions 4e of the groove 4f are extended so that all pin tumblers 5 will remain in their respective code positions until the side-bar has been pressed outwardly from its locking position by the driving pins 7.

The positions of respective waisted portions 5b of the pin tumblers 5 and the position of the tongue 6b on the side-bar 6 may be varied.

FIG. 7 shows the key 4 inserted to an operative position in the lock, wherein the pin tumblers 5 automatically take their coded positions in which the tongue 6b of the side-bar 6 is able to enter the waisted portion 5b. As the plug 3 is turned by the key, the side-bar 6 is pressed inwardly to the release position shown in FIG. 7, in which position the plug 3 can be turned.

FIG. 8 shows the pin tumbler 5, its flanges 5a and its waisted portion 5b. The illustrated pin tumbler also presents a number of "false" waisted portions 5c of smaller depth than the waisted portion 5b, to render forcing of the lock difficult.

Figure 9:
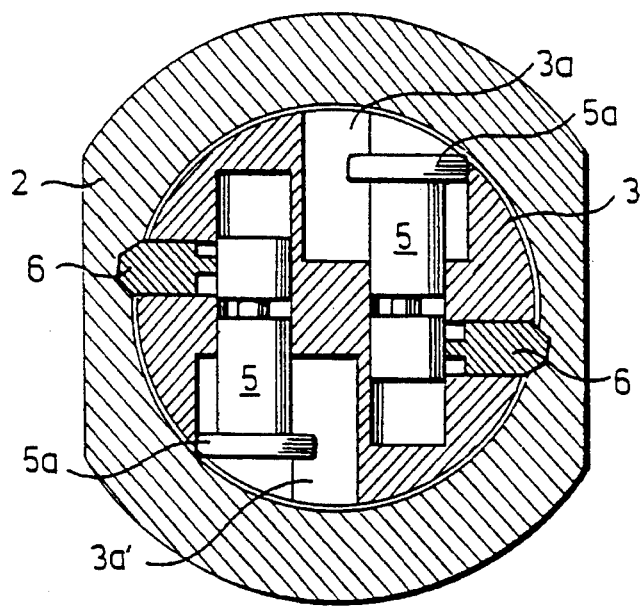
FIG. 9 is a sectional view corresponding to FIG. 3 and illustrates a modified embodiment in which the plug includes two rows of pin tumblers, wherein the tumblers of each row are intended to coact with a respective side-bar, and in which the key slot is intended to accommodate two keys.

FIG. 9 illustrates an embodiment in which two different keys must be inserted in the divided key slot 4a' in order to open the lock. Each of the keys (not shown) coacts with a pin tumbler/pin tumbler arrangement according to the earlier Figures. Alternatively, a single key in which the key blade is divided into two parts may be used.

Figure 14:
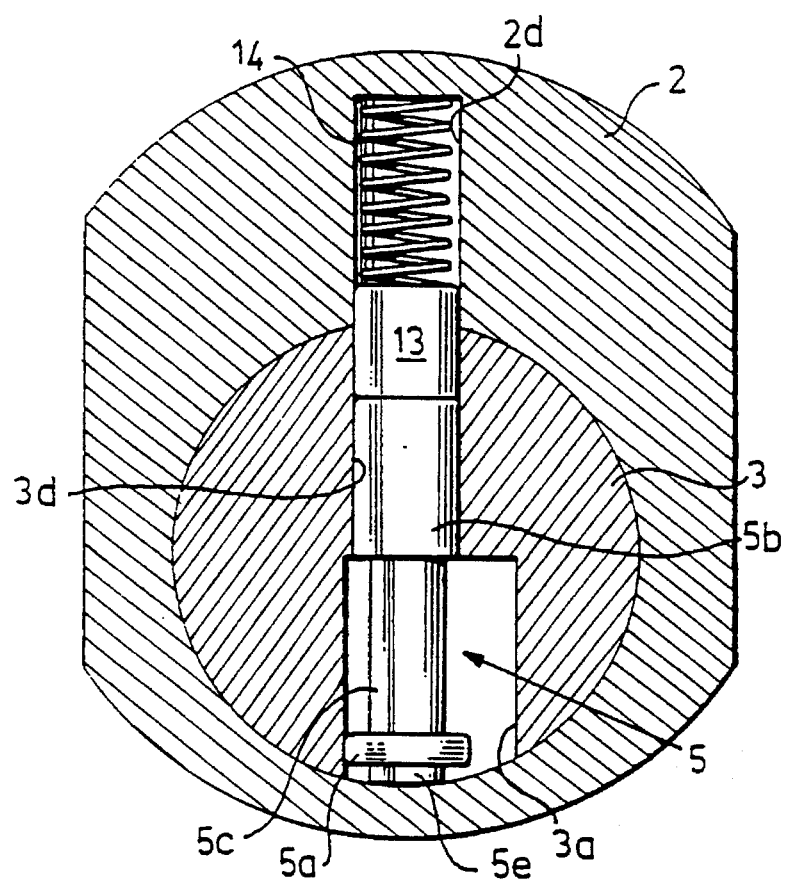
FIG. 14 is a cross-sectional view of a modified embodiment, in which the flanged tumblers in said tumbler rows are positioned more centrally in the plug and the key slot and function as top tumblers which coact with bottom tumblers.

FIG. 14 illustrates the manner in which the invention is applied in an alternative cylinder lock which lacks a side-bar. Instead, the locking housing 2 includes a row of tumblers channels 2d which accommodate top tumblers 13 that are activated by springs 14.

In addition to the key slot 3a, the plug 3 also includes a row of bores 3d which lie in register with the bores 2d in the lock housing 2 when the plug 3 is in the position shown in FIG. 14 and the key is withdrawn, therewith latching the plug. In this case, the tumbler 5 provided with flange 5a functions as a bottom tumbler and includes a part 5b which is received in the bore 3d of the plug. Located between the tumbler part 5b and the tumbler flange 5a is a narrower part 5c, and a corresponding narrow part 5e is also provided beneath the flange 5a. The flange 5a is thus located at a distance from the end of the tumbler and has a part of smaller diameter on its top and bottom sides.

One or more intermediate tumblers may be provided between the bottom tumbler 5 and the top tumbler 13 in a conventional manner, so as to enable the lock to be expanded to form a system lock.

Figure 15:
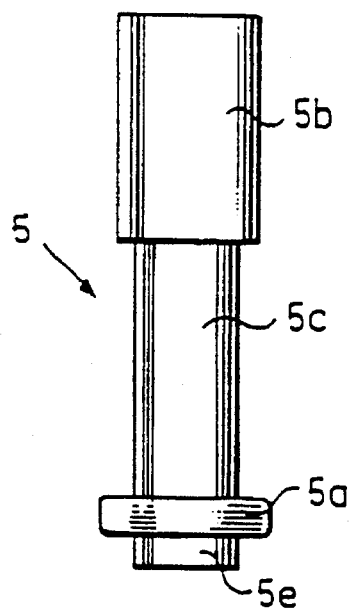
FIG. 15 is a side view of one such flanged tumbler.

FIG. 15 is a side view of the flanged bottom tumbler 5 used in the FIG. 14 embodiment.

Figure 16:
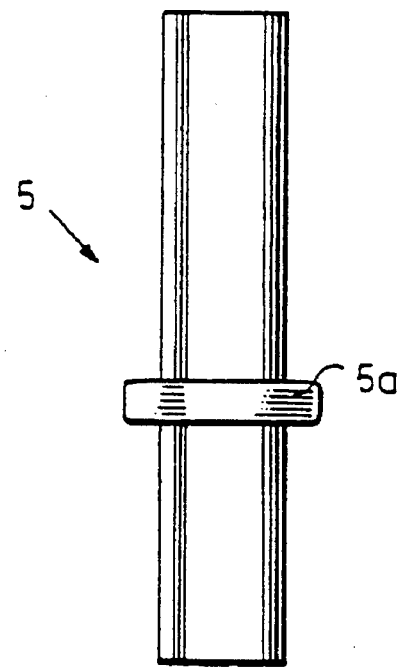
FIG. 16 is a side view of another tumbler configuration.

FIG. 16 illustrates another possible configuration of the flanged tumbler 5, which in this case is intended to function as a latching pin, i.e. without coacting with bottom tumblers. Instead, the top or the bottom part of the flanged tumbler will engage directly with a corresponding bore in the cylinder plug. The flanged tumbler may be spring-activated in the case of this embodiment.

Figure 10:
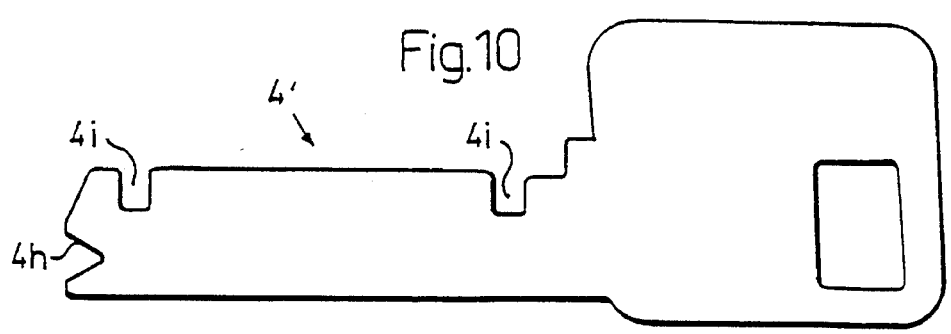
FIG. 10 is a side view of a key blank for the manufacture of a key of a combination constructed in accordance with the invention.

FIG. 10 illustrates a key blank from which a key for use with the lock illustrated in FIGS. 1–8 and in FIG. 14 can be produced. The key blank may be clipped from metal plate and has a key grip and a key blade which is provided with the two notches or recesses 4i for coaction with the driving pins. The front end of the key blank has a V-shaped recess or notch 4h which forms a widened end-part of the groove provided in the side surface of the key blade.

FIG. 11 illustrates the manufacture of a key from the key blank shown in FIG. 10, by milling a groove 4f of the relevant kind with the aid of a milling tool 10 driven by a drive means 11. The thickness of the milling tool 10 corresponds to the width of the groove 4f in the region of the straight code parts 4e. As the milling tool and/or the key blank move relative to one another, transition parts 4g are formed between the code parts 4e, these transition parts 4g having a greater width than the code parts 4e. The widened end region of the groove 4f is illustrated in more detail in FIG. 12, where the V-shaped parts of the groove are referenced 4k.

FIG. 17 illustrates a part of the key 4 corresponding to FIG. 11 upon completion of the code groove 4f in the side part 4c. The sectional views shown in FIGS. 18 and 19 illustrate the code groove 4g more clearly, partly with respect to its straight code parts 4f (FIG. 18) and partly with respect to the sloping transition parts 4g (FIG. 19).

It will also be seen from FIGS. 17–19 that the straight parts 4f of the code groove are slightly wider than the tumbler flanges 5a with which they are intended to coact, whereas the sloping parts 4g of the code grooves have a greater width. As will be seen from FIG. 18, the code groove is concave in the junctions between the straight parts 4f and the sloping parts 4g.

FIG. 13 is a cross-sectional view of a cylinder plug 3 which includes double rows of tumblers 5 and double side-bars 6, wherein the edge surface of the key (not shown) is also intended to coact with top tumblers 12, 13.

In the case of this lock embodiment, the key is provided with a groove on each side surface thereof, and the edge of the key blade is provided with a top code.

FIG. 20 illustrates a cylinder lock-key-combination according to an alternative embodiment comprising a lock cylinder 2 and a key 4. The lock cylinder 2 includes a plug 3 which is provided with a key slot 3a.

As will be seen from FIG. 22, the plug 3 includes a row of key-actuable pin tumblers 5 whose axes lie in a symmetry plane through the plug 3, this plane being parallel with the plane of the key slot 3a and spaced therefrom. The tumblers 5 are movable in said plane and are rotatable about their long axes.

Each of the tumblers 5 is provided with a flange 5a between its respective ends, these flanges being intended to be received in a groove 4f in the side surface 4c of the key. The configuration of the groove will be described in more detail further on.

The key 4 has an top edge surface 4b which may be provided, optionally, in a standard manner, with a code (not shown) for coaction with further tumblers (not shown) in the cylinder plug.

The key 4 has a key grip 4a and a side part 4c which is provided with the aforesaid groove 4f for coaction with the tumbler flanges 5a.

The width of the groove 4f varies and the groove includes a number of straight code parts 4e and a number of angled transition parts 4g whose widths are greater than the widths of the code parts 4e.

As indicated at 4h, the groove widens outwardly in the region of the tip of the key, therewith to ensure positive engagement with the tumbler flanges 5a.

As the key 4 is inserted, the groove 4f will engage with the tumbler flanges 5a, both on the top and the bottom sides thereof. The tumblers will therefore be forcibly guided by the key to their respective code positions.

The lengths of respective tumblers 5 correspond to the diameter of the plug 3. Located above and below each tumbler 5, which in this case can be called the central tumblers, is a tumbler 13 and 14 which are referred to here as the top and the bottom tumblers respectively. The top tumbler 13 and the bottom tumbler 14 are both activated by a respective spring 15 and 16 which have mutually different spring strengths.

The force exerted by the spring 15 is substantially greater than the force exerted by the spring 16, and the difference between the forces exerted by the mutually counteracting springs 15, 16 corresponds approximately to the force of a tumbler spring of a "conventional" cylinder lock.

As will be seen from FIG. 22, the arrangement is such that when a stronger spring 15 activates a top tumbler 13 and a weaker spring 16 activates a corresponding bottom tumbler 14, the reverse applies to mutually adjacent tumblers, i.e. a weaker spring 16 activates the top tumbler 13, and so on. Accordingly, the resistance exerted by the tumblers on the key as it is inserted into the lock will correspond to the resistance exerted normally in a cylinder lock.

At the same time, an inventive cylinder lock which includes a central pin tumbler and top and bottom tumblers which are activated by springs of mutually different strengths affords the advantage of being much more difficult to force than a lock constructed in accordance with the aforegoing.

The ends of the central pin tumblers are conveniently bevelled or chamfered, as are preferably also the ends of the top and bottom tumblers 13, 14 coacting with the ends of the central tumblers.

The flanges 5a of the central tumblers 5 are received by and guided in the bores 3d in the plug 3.

In the case of the alternative principal embodiment illustrated in FIGS. 23–26, the key 4 includes an engagement member in the form of a rail 4k which projects out from the side surface 4c of the key, and the central tumblers 5 include a receiving member in the form of a waist 5k whose axial extension exceeds the width of the rail 4k on the key 4. The rail 4k on the key 4 has parts 4k' and intermediate transition parts 4k" corresponding to the relevant code positions.

Thus, as the key is inserted into the lock, the rail 4k engages the waists 5k of respective central tumblers 5 while moving the tumblers 5 to their respective code positions.

The waist 5k of respective tumblers 5 is delimited by conical transmission parts 5e, thereby facilitating engagement of the rail 4k with the central pin tumblers.

As will be seen from FIG. 26, this embodiment includes top tumblers 13 and bottom tumblers 14 above and below each of the central tumblers 5. The tumblers are activated by springs 15 and 16, which may have mutually different strengths.

The rail 4k may be formed on a key of the kind illustrated in FIG. 23 in any one of a number of ways. For instance, the rail may be formed by mechanically cutting the rail in the key material or may have the form of a separate strip which is brought to the desired shape and then joined to the main part of the key, for instance welded, soldered or fused thereon. Alternatively, the key may be moulded.

FIGS. 29 and 30 illustrate a further embodiment of the first principal alternative of the invention, in which the lock cylinder 2 is circular and the plug 3 accommodates key-actuable tumblers or latching pins 5 whose lengths correspond to the diameter of the plug and which are not activated by springs. As the key is removed from the lock, the tumblers or latching pins 5 move to their respective latching positions under the influence of gravity and/or the code groove position at the tip of the key. The pin tumblers are provided with a flange 5a for coaction with a key of the kind illustrated in FIG. 20. In order to enable the key to engage the central flange of respective pin tumblers, there is provided on each side of the central flange a shoulder 5b whose diameter is slightly greater than the diameters of the tumbler-accommodating bores 3e, 2d in the plug and the lock cylinder respectively. This ensures that the front part 4h of the groove 4f in the key 4 will always engage with the central flange 5a.

It will be understood that the embodiment illustrated in FIG. 29 is of very simple design.

Figure 31:
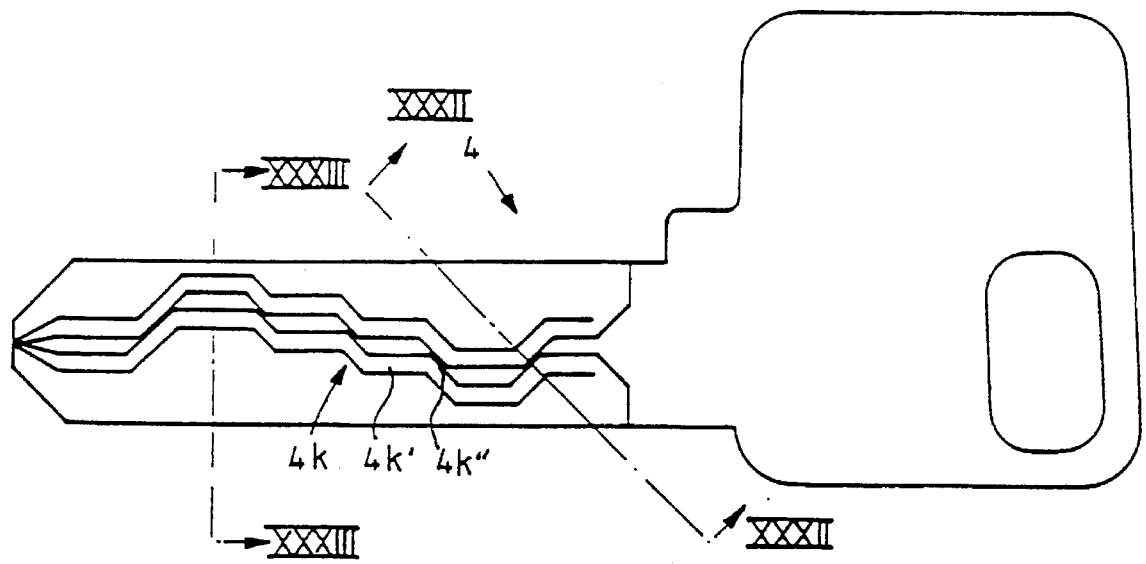
FIG. 31 is a side view of a key which is provided with rail means according to the alternative principal embodiment, this key being a modified version of the key illustrated in FIG. 23.
Figure 32:
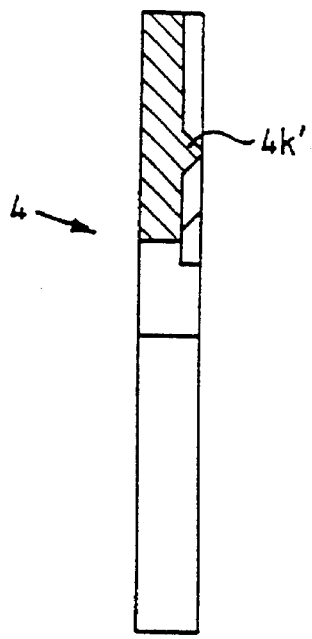
FIG. 32 is a sectional view of the key shown in FIG. 31, taken on the line XXXII—XXXII.
Figure 33:
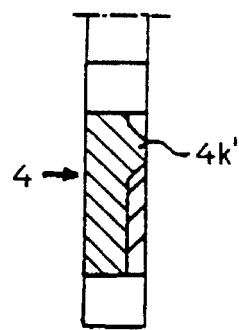
FIG. 33 is a sectional view of the key shown in FIG. 31, taken on the line XXXIII—XXXIII.

FIGS. 31–33 illustrate a further modified key according to the second principal alternative, in which the key blade is provided with a rail.

In this embodiment, the width of the rail 4k varies along the length of the key. In this case, the straight parts 4k' are wider than the sloping transition parts 4k", i.e. the reverse prevails in relation to a grooved key according to the first principal alternative illustrated in FIGS. 17–19 for instance.

As will be seen from the sectional view of FIG. 32, the rail 4k' has a generally smaller width at the junctions between straight and sloping parts, so that those tumblers which are activated by the rail are moved forcibly, in the absence of any play, in the axial direction of the tumblers, at the same time as the tumblers are free to rotate about their longitudinal axes.

It will be apparent from the aforegoing that the mutually adapted and mutually coacting engaging and receiving members of the tumblers and the lock key ensure that the tumblers are forcibly guided in two opposite axial directions to respective code positions as the key is inserted. At the same time, the tumblers are able to rotate around their respective axes through one or more turns or parts thereof, although not through a predetermined number of degrees.

Although the invention has been described above with reference to various alternative embodiments and applications thereof, it will be understood by those skilled in this art that an inventive combination can be realized in ways other than those described and illustrated without departing from the concept of the invention as defined in the following claims.

I claim:

1. A cylinder lock-key-combination in which the cylinder lock (1) comprises:

a) a cylinder which is housed in a cylinder housing (2);

b) a plug (3) which is accommodated in the cylinder housing (2) and has a key slot (3a), which defines a plane, and a row of pin tumblers (5) whose axes lie in one of the plane of the key slot and in a plane which is substantially parallel with the plane of the key slot, and in which the pin tumblers are operative to move in a pin tumbler plane and rotate about their axes when activated by the key (4); and which key includes c) side regions and a code which is formed in the side regions of the key and which functions to coact with the pin tumblers (5) in said row so that subsequent to inserting the key to its operative position in the key slot (3a), each pin tumbler will occupy a position which allows the plug (3) to be turned, wherein d) the pin tumblers (5) and the key (4) each have a complementary engaging and receiving member (5a, 4f; 5k, 4k) which cooperate to guide the tumblers forcibly in two mutually opposite axial directions to respective code positions as the key is inserted, while permitting the tumblers to rotate freely about their respective axes, each said code position being defined by two opposite planar surfaces on each said engaging and receiving member, respectively.

2. A combination according to claim 1, wherein each tumbler (5) includes an engaging member in the form of a circular flange (5a); and in that a side surface (4c) of the key (4) includes a receiving member in the form of a groove (4f) whose width varies along its length so as to accommodate the circular flanges (5a).

3. A combination according to claim 2, wherein the groove (4f) includes the planar surfaces in the form of straight parts (4e) which extend parallel with the key insertion direction and which normally define the code positions, and further include intermediate, angled transition parts (4g) of greater width.

4. A combination according to claim 3, wherein a code position is also defined by one or more of the transition parts (4g).

5. A combination according to claim 1, further comprising a recess (3c) in the plug (3) for accommodating a tumbler-coacting side-bar (6) which is movable in a plane substantially perpendicular to the tumbler plane; a groove (2a) in the cylinder housing (2) for accommodating the side-bar (6) in its locking position; and a member (6a) comprising a tongue on the side-bar (6), which, in its release position, coacts with a corresponding member (5b) comprising one of a groove and a waisted portion on respective tumblers in the row, so that the side-bar is operative to leave the groove (2a) in the cylinder housing (2) as the plug (3) is rotated, wherein the side-bar (6) is activated by at least one driving pin (7) which coacts with a side surface of the key and which is guided for movement in the plug at right angles to the plane of the key slot (3a) and which urges the side-bar to its locking position as the key is withdrawn from a fully inserted position with the side-bar (6) in its release position.

6. A combination according to claim 5, wherein the end of the at least one driving pin (7) distal from the side-bar (6) is received in a corresponding depression (4i) in the key (4) when the key is in its operative position.

7. A combination according to claim 6, wherein the planar surfaces define straight, normal code positions (4e) on the key groove (4f) which are extended through a distance which exceeds a radius of respective driving pins (7).

8. A combination according to claim 6, wherein a depth of the depression (4i) in the key (4) which accommodates the driving pin (7) corresponds to or exceeds the depth to which the tongue (6b) penetrates into a corresponding waisted portion (5c), of respective tumblers (5).

9. A combination according to claim 1, wherein the other side of the key (4) is also provided with a groove for coaction with a further row of tumblers (5) and a further side-bar (6) in the plug (3).

10. A combination according to claim 2, in which the tumblers (5) form bottom tumblers for coaction with spring activated top tumblers (13) through the intermediary of one or more intermediate tumblers, wherein the circular flange (5a) is spaced from the end of respective tumblers and has a part (5c; 5e) of smaller diameter on its top and bottom sides.

11. A combination according to claim 2, in which the tumblers (5) function as latching pins, wherein the circular flange (5a) is spaced from both ends of the tumblers or pins.

12. A combination according to claim 1, wherein the tumblers (5) include a waisted portion (5k); in that the key (4) includes a rail (4k) which projects out from a side surface (4c) and which includes parts (4k') and intermediate transition parts (4k") corresponding to the relevant code positions; and in that when inserting the key, the rail (4k) engages in the waisted portions (5k) of respective tumblers while moving the tumblers to their respective code positions.

13. A combination according to claim 12, wherein the waisted portion (5k) of respective tumblers (5) is delimited by conical transition parts (5e).

14. A combination according to claim 13, wherein there is provided on both sides of each tumbler at least one further tumbler, including a top tumbler (13) and a bottom tumbler (14), respectively, and at least one intermediate tumbler (17, 18).

15. A combination according to claim 14, wherein the top tumbler and the bottom tumbler (13, 14) and the intermediate tumbler (17, 18) are each activated by a spring (15, 16); and in that the springs have mutually different strengths.

16. A combination according to claim 15, wherein the difference between the spring strengths of the mutually counteracting springs (15, 16) corresponds approximately to the strength of a normal tumbler spring of a cylinder lock.

17. A combination according to claim 16, wherein the springs (15, 16) of greater or lesser spring strengths alternately activate the top tumblers and the bottom tumblers (13, 14) and the intermediate tumblers (17, 18) in the row, such that adjacent tumblers (5) are urged in different directions and such that essentially an equal number of the tumblers (5) are urged in one and the other direction respectively.

18. A combination according to claim 14, wherein the tumblers (5) and the top and the bottom tumblers (13, 14) and the intermediate tumblers (17, 18) have bevelled ends.

19. A combination according to claim 1, wherein the key slot (3a) is positioned asymmetrically in the plug, so that the tumbler axes will lie essentially in the centre plane of the plug.

20. A combination according to claim 1, wherein the tumbler-accommodating bores in the plug (3) and the bores in the lock cylinder (2) slope in relation to the plug axis at an angle which is smaller than 5° and which is greater than or equal to about 3°.

21. A key for a cylinder lock (1) which comprises a cylinder which is housed in a cylinder housing (2); a plug (3) which is accommodated in the cylinder housing (2) and has a key slot (3a), which defines a plane, and a row of pin tumblers (5) whose axes lie in one of the plane of the key slot and in a plane which is substantially parallel with the plane of the key slot, and in which the pin tumblers are operative to move in a pin tumbler plane and rotate about their axes when activated by the key (4); said key comprising side regions and a code which is formed in the side regions of the key and which functions to coact with the pin tumblers (5) in said row so that subsequent to inserting the key to its operative position in the key slot (3a), each pin tumbler will occupy a position which allows the plug (3) to be turned, wherein each tumbler (5) includes an engaging member in the form of a circular flange (5a); and wherein at least one side surface (4c) of the key (4) includes a receiving member in the form of a groove (4f) whose width varies along its length so as to accommodate the circular flanges (5a), and further wherein the groove (4f) has a number of defined, planar code position parts (4e) which extend parallel with the key insertion direction and which correspond to the number of tumblers (5) in the row in the plug (3); in that located between the planar code position parts (4e) are transition parts (4g) whose breadth is greater than the breadth of the code position parts, the breadths of which correspond to the height or thickness of the circular flanges (5a) and the breadth of which transition parts (4g) corresponds to the circular flanges (5a).

22. A method of producing a key from a key blank (4'), said key being for a cylinder lock (1) which comprises a cylinder which is housed in a cylinder housing (2); a plug (3) which is accommodated in the cylinder housing (2) and has a key slot (3a), which defines a plane, and a row of pin tumblers (5) whose axes lie in one of the plane of the key slot and in a plane which is substantially parallel with the plane of the key slot, and in which the pin tumblers are operative to move in a pin tumbler plane and rotate about their axes when activated by the key (4); said key comprising side regions and a code which is formed in the side regions of the key and which functions to coact with the pin tumblers (5) in said row so that subsequent to inserting the key to its operative position in the key slot (3a), each pin tumbler will occupy a position which allows the plug (3) to be turned, wherein each tumbler (5) includes an engaging member in the form of a circular flange (5a); and wherein at least one side surface (4c) of the key (4) includes a receiving member in the form of a groove (4f) whose width varies along its length so as to accommodate the circular flanges (5a), said method comprising the steps of:

passing a cylindrical milling tool (10) having a diameter, thickness and configuration which correspond to the circular flanges (5a) along the key blank (4') in a plane which is parallel with the plane of the key blank and along a path which includes a plurality of straight parts (4e) and transition parts (4g) located therebetween; and cutting the groove (4f) in the key blank (4') such that a top side, bottom side and peripheral surface of the milling tool assist in said cutting, so that the groove (4f) has a greater width in the transition parts (4g) than in the straight parts (4e) to accommodate the circular flanges (5a) on the pin tumblers when the lock is used.

* * * * *